Patented May 3, 1938

2,116,065

UNITED STATES PATENT OFFICE 2,116,065

COATED ORGANIC MATERIALS AND PROCESSES AND COMPOSITIONS

John L. Elliot, New York County, N. Y., assignor to The International Printing Ink Corporation, New York, N. Y., a corporation of Ohio No Drawing. Application August 4, 1934, Serial No. 738,534

5 Claims. (Cl. 91—68)

This invention relates to coated organic materials and processes and compositions for producing the coating, and is herein described in some detail as applied to paper.

Various methods of coating paper and other materials are in use for different purposes, but no coatings available at commercial prices are both water-proof and grease-proof when creased, nor are coatings commercially available which give satisfactory sheen to printed paper and otherwise embellish it by enhancing the color and detail of what is printed on the paper. Moreover, most coated papers crack more easily than the base paper out of which they are made and are weaker than the base paper.

Still fewer coated papers are found to be moisture-proof when subjected to the standard laboratory tests. Besides this, many coatings are expensive and practically all deteriorate rapidly or cause the base papers which carry them to deteriorate.

What is said above applies in more or less degree to coatings on cotton and silk, cloth, and on leather. According to the present invention the foregoing and other difficulties are overcome, and a paper or other surface is produced having greatly increased strength, and greater resistance to damage by creasing or folding, being absolutely water-proof and grease-proof, if desired. Moreover the coating may be so applied to paper as to enhance the richness of color, to produce a hitherto unattainable sheen, and to develop beauty of detail in color printing carried upon the paper.

The form of the coating found most effective for some purposes has been found to lie principally within the paper, adding too little to its thickness to be measured by any ordinary micrometer calipers yet such a coating may fully double the strength of the paper beside rendering it water-tight and grease-proof.

The coating materials of the present invention are non-toxic, at least in any amounts likely to be used, and, as a result, the coated papers are well adapted for wrapping foods and other wet or greasy or perishable articles.

In the form of the invention described in some detail, the coating material is largely composed of rubber, which, with the admixture of some materials of the present invention, even in relatively small proportions is found to penetrate paper and some other organic materials and to distribute itself uniformly over them, closing the pores, and behaving as though it "wetted" the fibers of the paper in a way hitherto deemed impossible.

Other features and advantages will hereinafter appear.

A special synthetic gum was prepared by heating together about equivalent reacting molecular proportions of glycerine and the phthalic radical in the form of phthalic acid or phthalic anhydride, about twice as much of the acid or anhydride as glycerine. The most satisfactory composition was obtained by heating a mixture of the glycerine and anhydride to above 200° C. and allowing it to cook for about twenty minutes between 200° C. and 210° C.

The best results were obtained when the hot mixture contained an addition of about 0.25% of either ammonium hydroxide, ammonium carbonate, zinc carbonate, or sodium hydroxide or carbonate. Apparently these added materials served as more or less alkaline catalysts.

Longer heating produced a harder gum or resin which proved useful but not as desirable for many purposes as the short cooked gum. As much as eighteen hours treating has proved useful where very tough materials were desired. Glycerine seems most useful, though apparently, other polybasic alcohols may be substituted for it, such as the simpler glycols.

The special gum prepared as above was soluble in many organic solvents, but, considering price, the two most generally useful ones were petroleum spirit and ethylene dichloride.

For making paper grease-proof and waterproof a solution of the gum was mixed with a solution of rubber in the same solvent, and the mixed solutions applied to the paper base.

Certain precautions were advisable in preparing the mixed solution. It was found best to pour the solution of gum into the solution of rubber a little at a time and thoroughly mix in each added portion until a clear solution was obtained before adding another portion. The best results were obtained in mixing with rubber when the rubber was dissolved in a suitable petroleum spirit, ethylene dichloride or benzole.

It was found that satisfactory results could be obtained by using a dispersion of the gum in water mixed with a dispersion of rubber in water, such as natural latex. Artificial dispersions of rubber in water were successfully made, when such a dispersion was emulsified, in presence of ammonium linoleate, with a solution of the gum in one of the organic solvents.

The liquid carrying the rubber and gum was satisfactorily spread on paper by a "doctor bar"

giving a thin even coating which dried in less than thirty-five or forty seconds. The coating left on the paper was very tacky although a coating on paper printed in several colors took up only 0.31 gram in 58 square inches. Moreover, despite the very obvious tackiness, the thickness of the paper showed no measurable increase when measured with micrometer calipers.

The following three mixtures were found satisfactory:

|  | 1 | 2 | 3 |
|---|---|---|---|
| Special gum or resin | 10 | 20 | 15 |
| Rubber (pale crepe) | 90 | 80 | 85 |
| Ethylene dichloride | 400 | 355 | 48 |
| Petroleum spirit or solvent |  |  | 252 |
| Alcohol |  | 45 |  |

Other varieties of rubbers, such as smoked sheet dried latex and even reclaimed rubber where color was not objectionable, proved useful.

The above coating compositions, when spread on paper, produced a pliable material, decidedly more flexible than the uncoated paper, and one from which the coating did not peel, though it was decidedly tacky, and one which did not crack when creased sharply.

Upon this coating was spread a second coating to eliminate the tackiness. The second coating included the same gum or resin, but no rubber. Instead of rubber, the second coating included cellulose derivatives carried in a suitable solvent.

The three following mixtures provided suitable solids for the second coating:

|  | 1 | 2 | 3 |
|---|---|---|---|
| Special gum resin | 30 | 40 | 20 |
| Cellulose acetate | 50 | 35 | 55 |
| Cellulose nitrate (½ sec.) | 5 | 10 | 10 |
| Plasticizer (Saniticizer M17) | 15 | 15 | 15 |

Cellulose acetate was of especial value because it had no tendency to curl the coated paper by shrinking. Otherwise the nitrate might be used alone. Nitrate was not essential but seemed to give a somewhat more reliable coating when present to at least several per cent. Other cellulose esters were usable but at a commercially prohibitive cost.

The foregoing solids were satisfactory when dissolved in a wide variety of solvents, such as acetone, ethyl acetate, butyl acetate mixtures and other solvents, usually to carry three pounds solids per gallon. The three following mixtures provide suitable solvents:

|  | 1 | 2 | 3 |
|---|---|---|---|
| Ethylene dichloride | 75 | 70 | 60 |
| Alcohol | 25 | 25 | 25 |
| Ethyl acetate |  | 5 | 15 |

The coatings, both first and second, were satisfactorily applied by a spreading machine or doctor bar or blade. It was also found possible to apply the coatings as sprays.

When the second coating was applied over the first the 58 square inches of paper carried an additional 0.5 gram of solids, or a total of 0.81 gram.

It was found possible to put on a waxing paper a first coat of 0.0015 inch and a second coat of 0.00075 inch, producing a film, apparently within the sheet, which stretched without breaking even when the paper fibres were pulled apart and the top coating had given away.

A paper coated with the resin compound containing spray dried latex rubber or with the latex emulsion described above was found to give the paper more tensile strength than the same paper uncoated.

The double coated papers, made as above, were found to be fully fifty percent stronger than the uncoated paper besides being grease-proof and water-proof.

It was found possible to coat other organic fibrous base material such as fine silk fabrics, including crepe and plain woven silk, by the same double coat process. The product made of white silk was cream-colored, instead of white, and was somewhat stiffened, but was fully water-proof and grease-proof.

A heavily sized cotton cloth, roller shade cloth, was also successfully coated by the same double coat process, yielding a flexible, non-cracking water-proof and grease-proof fabric. It was successfully washed without injury, with soap and water.

It has been found that several weeks' exposure to the weather and bright sun is without adverse effect on coated paper made by this process.

The two coatings, as intimated above, were successfully applied to a paper label printed in several colors, and the coatings, instead of causing the printer's ink to spread, were found to enhance the brilliancy of the colored inks, to develop detail, and to embellish the label with a hitherto unattainable sheen.

The presence of plasticizer in the formulas given above is of some advantage, but is not essential. Moreover, the cellulose ester need not be pure. Esters reclaimed from scrap and carrying, apparently, other plasticizers, were found useful.

The presence of the special gum seems to cause the rubber to "wet" the paper or other base material, with the result that the rubber spreads evenly over the base material and completely covers it, even when the covering is extremely thin.

The foregoing description is based on a phthalic glyceride, because that is commercially useful and the most economical material so far tested.

Even better results were obtained by substituting the product which was obtained by heating for five hours under a reflux condenser at 100° C. fifty grams acetaldehyde, one gram sodium hydroxide and five c. c. of water.

Another substitute material which was found to eliminate all tendency to hygroscopicity was obtained by heating for 25 minutes to 210° C. one part phthalic anhydride, one part citric acid, and one part glycerol.

A third highly superior substitute material was obtained by heating 210 parts phthalic anhydride, and 184 parts glycerol, to 210° C. until gas no longer came off, then stirring in 118 parts succinic acid and heating at 220° C. until jelly-like.

Having thus described certain embodiments of the invention, what is claimed is:

1. The process of coating an organic base sheet which consists in applying to it a solution of rubber carrying a phthalic-anhydride-glycerine condensation product adapted to cause the rubber to wet this sheet, and then applying a solution of a cellulose ester including a softener to cover the first coating.

2. A paper carrying a coating consisting largely of rubber and containing a less quantity of a compound of glycerine and a substance selected from phthalic anhydride and phthalic acid and adapted to cause the rubber to wet the paper, and also carrying a cellulose ester and a further quantity of the compound.

3. A paper carrying a coating consisting largely of rubber and containing a less quantity of a phthalic anhydride-glycerine condensation product miscible with the rubber and adapted to cause the rubber to wet the paper, and a further coating consisting largely of cellulose acetate and carrying a further quantity of the phthalic anhydride glycerine condensation product.

4. A paper carrying a coating consisting largely of rubber and containing a compound of glycerine and a substance selected from phthalic anhydride and phthalic acid and adapted to cause the rubber to wet the paper and produce a strong and water-proof paper, and a further coating containing cellulose acetate and said compound.

5. The process of coating an organic base sheet which consists in applying to it a solution of rubber carrying a polybasic acid-polyhydric alcohol condensation product adapted to cause the rubber to wet the sheet and then applying a solution of a cellulose ester including a softener to cover the first coating.

JOHN L. ELLIOT.